Sept. 27, 1966 G. F. CHANDLER 3,276,013
DECIMAL TO BINARY CONVERTER
Filed Feb. 19, 1964
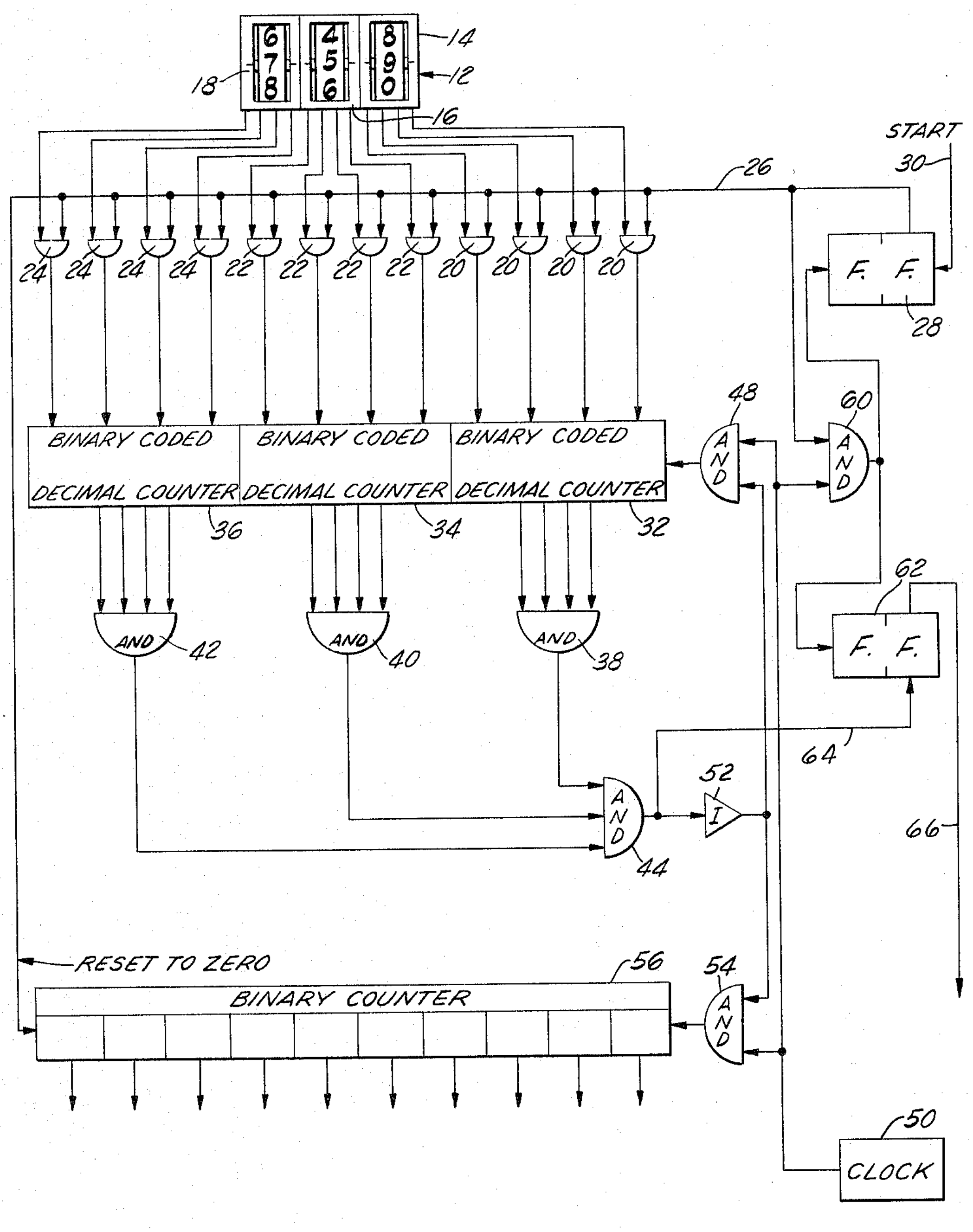
INVENTOR.
GERALD F. CHANDLER
BY Lyon & Lyon
ATTORNEYS United States Patent Office 3,276,013

Patented Sept. 27, 1966

3,276,013
DECIMAL TO BINARY CONVERTER

Gerald F. Chandler, La Mesa, Calif., assignor to Cohu Electronics, Inc., San Diego, Calif., a corporation of Delaware Filed Feb. 19, 1964, Ser. No. 345,872
18 Claims. (Cl. 340—347)

This invention relates to a conversion system and more particularly relates to a system for converting a decimal number to a binary number.

Most computer and data processing systems require the entry of various numbers into them. Since the systems generally utilize a binary code, it is necessary that conversion be made from a conventional decimal number to its binary equivalent. While this conversion can be made mentally by the operator, it is desirable that the conversion be made automatically and electrically so that time can be saved and an unskilled operator be used. It is therefore an object of the present invention to provide a system for making such a decimal to binary conversion.

It is another object of the present invention to provide such a system wherein a manually set decimal number will be rapidly and automatically converted to its binary equivalent.

These and other objects and advantages of the present invention will become more apparent upon reference to the accompanying description and drawing, the single figure of which is a schematic representation of the system of the present invention.

Turning now to the drawing, a thumbwheel switch 12 is provided with three wheels 14, 16 and 18, representing units, tens and hundreds, respectively. Of course, more or less wheels could be provided as desired. As is conventional, each of the wheels has four output lines associated therewith, each of the output lines of the wheel 14 being fed to an AND gate 20, each of the lines from the wheel 16 being fed to an AND gate 22, and each of the lines of the wheel 18 being fed to an AND gate 24.

The other input to each of the AND gates 20, 22 and 24 is connected to an output line 26 from one stage of a flip-flop 28. This stage is caused to produce an output signal by the occurrence of a start signal on the line 30.

The output of each of the AND gates 20 is applied to one of the stages of a four stage binary coded decimal counter 32. Similarly, the outputs of the AND gates 22 and 24 are applied to the various stages of the four stage binary coded decimal counters 34 and 36.

The zero outputs of the four stages of the binary coded decimal counter 32 are fed to a coincidence circuit or AND gate 38 while the zero outputs of the stages of the binary coded decimal counter 34 are fed to an AND gate 40 and the zero outputs of the binary coded decimal counter 36 are fed to an AND gate 42. The outputs of the AND gates 38, 40 and 42 are applied to the inputs of an AND gate 44.

Counting pulses are applied to the binary coded decimal counters 32, 34 and 36 from the output of an AND gate 48, the inputs of which are connected to a source of clock pulses 50 and the output of an inverter 52 which is coupled to the output of the AND gate 44. These two lines are also connected to the inputs of an AND gate 54 which applies counting signals to a binary counter 56. A reset signal is applied to the binary counter 56 on the line 26 from the flip-flop 28.

The clock pulses from the source 50 are also applied to an AND gate 60 together with the signal on the line 26. The output of the AND gate 60 is applied to the second stage of the flip-flop 28 and one of the stages of a flip-flop 62. The other stage of the flip-flop 62 has its input connected to the output of the AND gate 44 through a line 64. The output of this other stage of the flip-flop 62 appears on the line 66.

The operation of this system is as follows. The operator sets the desired decimal number by means of the wheels 14, 16 and 18 of the thumbwheel switch 12. A start button or the like is then operated to cause a start signal to appear on the line 30. This signal causes the flip-flop 28 to produce an output on the line 26 which causes the series of AND gates 20, 22 and 24 to be gated open so that the numbers set on each of the wheels 14, 16 and 18 of the thumbwheel switch 12 are entered into the binary coded decimal counters 32, 34 and 36, respectively. The signal on the line 26 also causes the binary counter 56 to be reset to zero and, upon the occurrence of a clock pulse, causes the AND circuit 60 to produce an output signal which turns off the output of the flip-flop 28 and also switches the flip-flop 62 so that no signal appears on the line 66.

If a three digit number has been entered into the binary coded decimal counters, at least one of the inputs to each of the AND gates 38, 40 and 42 is not energized, and thus none of these AND gates produces an output signal and, consequently, neither does the AND gate 44. The output of the AND gate 44 is inverted, however, by the inverter 52 so a gating signal is applied to the AND gate 48 and permits the clock pulses from the source 50 to count down the binary coded decimal number in the binary coded decimal counters. The output of the inverter 52 also gates open the AND gate 54 so that the binary counter 56 counts the same clock pulses whicn are counting down the counters 32, 34 and 36.

After the number in the binary coded decimal counters 32, 34 and 36 is completely counted down, the zero output of each of their stages is energized and the AND gated 38, 40 and 42 each produce an output signal. In response to this condition, the AND gate 44 also produces an output signal which is inverted by the inverter 52 and thus causes the AND gates 48 and 54 to be turned off. The output of the AND gate 44 is also applied along the line 64 to the flip-flop 62 causing it to change state and an output to appear on the line 66. The appearance of a signal on the line 66 indicates that the decimal number has been converted and stored in the counter 56. The binary number can be read out of the binary counter 56 in any conventional manner. The system is now ready to handle another number.

From the foregoing description, it can be seen that a system has been provided for converting a manually set decimal number into the corresponding binary number. The conversion is extremely rapid and the system enables a binary number to be entered into a computer or the like by a person having no knowledge of the binary system. While the system as illustrated and described utilizes a thumbwheel switch to manually set the decimal number, it will be obvious to those skilled in the art that any corresponding mechanism could also be used. It should also be obvious that functional equivalents of the various logical circuits and combinations shown and described could be used within the scope of the present invention.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A decimal to binary converter comprising:
means for setting a decimal number;

means for converting each digit of said decimal number to its binary equivalent;
a source of pulses;
binary counting means;
first gating means coupling said source of pulses to said digit converting means;
second gating means coupling said source of pulses to said binary counting means; and
means coupled to said digit converting means for opening said gating means when a number is present in said digit converting means and closing said gating means when no number is present in said digit converting means.

2. A decimal to binary converter comprising:
means for setting a decimal number;
means for converting each digit of said decimal number to its binary equivalent and storing the resultant binary coded decimal number;
a source of pulses;
binary counting means;
first gating means coupling said source of pulses to said digit converting and storing means, said gating means being operable to permit said pulses to count down the binary coded decimal number stored in said digit converting and storing means;
second gating means coupling said source of pulses to said binary counting means, said gating means being operable to permit said binary counting means to count said pulses; and
means coupled to said digit converting and storing means and said first and second gating means and responsive to the presence of a binary coded decimal number stored in said converting and storing means to operate said first and second gating means.

3. A decimal to binary converter comprising:
means for setting a decimal number;
means for converting each digit of said decimal number to the binary equivalent thereof and storing the resultant binary coded decimal number;
a source of pulses;
binary counting means;
first gating means coupling said source of pulses to said digit converting and storing means, said gating means being operable to permit said pulses to count down the binary coded decimal number stored in said digit converting and storing means;
second gating means coupling said source of pulses to said binary counting means, said gating means being operable to permit said binary counting means to count said pulses;
means coupled to said converting and storing means and to said first and second gating means for producing an output signal when a binary coded decimal number is present in said converting and storing means, said output signal causing said first and second gating means to operate;
third gating means operable to couple said setting means to said converting and storing means; and
pulse producing means coupled to said third gating means and to said binary counting means for operating said third gatting means and resetting said binary counting means to zero.

4. A decimal to binary converter comprising:
means for setting a multi-digit decimal number;
a plurality of means for converting a digit of a decimal number to its binary equivalent, each of said means being coupled to said setting means for converting and storing each digit of the decimal number set therein;
a source of pulses;
binary counting means;
first gating means coupling said source of pulses to said digit converting and storing means, said gating means being operable to permit said pulses to count down the binary coded decimal number stored in said digit converting and storing means;
second gating means coupling said source of pulses to said binary counting means, said gating means being operable to permit said binary counting means to count said pulses;
means coupled to each of said plurality of converting and storing means for producing an output signal when there is no number stored in the respective converting and storing means; and
means coupled to said signal producing means and to said first and second gating means and responsive to the presence of an output signal from each of said signal producing means for rendering said first and second gating means operative.

5. A decimal to binary converter comprising:
means for setting a multi-digit decimal number;
a plurality of means for converting a digit of a decimal number to its binary equivalent and storing said binary equivalent;
a source of pulses;
binary counting means;
first gating means coupling said source of pulses to said digit converting and storing means, said gating means being operable to permit said pulses to count down the binary coded decimal number stored in said digit converting and storing means;
second gating means coupling said source of pulses to said binary counting means, said gating means being operable to permit said binary counting means to count said pulses;
means coupled to each of said plurality of converting and storing means for producing an output signal when there is no number stored in the respective converting and storing means; and
means coupled to said signal producing means and to said first and second gating means and responsive to the presence of an output signal from each of said signal producing means for rendering said first and second gating means operative;
third gating means operable to couple each of said plurality of means to said setting means whereby each of said means converts and stores a single digit of said decimal number; and
pulse producing means coupled to said third gating means and to said binary counting means for operating said third gating means and resetting said binary counting means to zero.

6. A decimal to binary converter comprising:
means for setting a multi-digit decimal number;
a plurality of binary coded decimal counters coupled to said setting means, each of said counters converting a single digit of said decimal number to its binary equivalent and storing the same;
a source of pulses;
a binary counter;
first gating means coupling said source of pulses to said binary coded decimal counters, said gating means being operable to permit said pulses to count down the binary coded decimal number stored in said counters;
second gating means coupling said source of pulses to said binary counter, said gating means being operable to permit said binary counter to count said pulses; and
means coupled to said binary coded decimal counters and to said first and second gating means and responsive to the presence of a number stored in said counters for rendering said first and second gating means operative.

7. A decimal to binary converter comprising:
means for setting a multi-digit decimal number;
a plurality of binary coded decimal counters;

a source of pulses;
a binary counter;
first gating means coupling said source of pulses to said binary coded decimal counters, said gating means being operable to permit said pulses to count down the binary coded decimal number stored in said counters;
second gating means coupling said source of pulses to said binary counter, said gating means being operable to permit said binary counter to count said pulses;
means coupled to said binary coded decimal counters and to said first and second gating means and responsive to the presence of a number stored in said counters for rendering said first and second gating means operative;
third gating means operable to couple each of said binary coded decimal counters to said setting means whereby each of said counters converts and stores a single digit of said decimal number; and
pulse producing means coupled to said third gating means and to said binary counter for operating said third gating means and resetting said binary counter to zero.

8. A decimal to binary converter comprising:
means for setting a multi-digit decimal number;
a plurality of binary coded decimal counters coupled to said setting means, each of said counters converting a single digit of said decimal number to its binary equivalent and storing the same;
a source of pulses;
a binary counter;
first gating means coupling said source of pulses to said binary coded decimal counters, said gating means being operable to permit said pulses to count down the binary coded decimal number stored in said counters;
second gating means coupling said source of pulses to said binary counter, said gating means being operable to permit said binary counter to count said pulses;
means coupled to each of said binary coded decimal counters for producing an output signal when there is no number stored in the respective counter;
means coupled to said signal producing means and to said first and second gating means and responsive to the presence of an output signal from each of said signal producing means for rendering said first and second gating means operative.

9. A decimal to binary converter comprising:
means for setting a multi-digit decimal number;
a plurality of binary coded decimal counters;
a source of pulses;
a binary counter;
first gating means coupling said source of pulses to said binary coded decimal counters, said gating means being operable to permit said pulses to count down the binary coded decimal number stored in said counters;
second gating means coupling said source of pulses to said binary counter, said gating means being operable to permit said binary counter to count said pulses;
means coupled to each of said binary coded decimal counters for producing an output signal when there is no number stored in the respective counter;
means coupled to said signal producing means and to said first and second gating means and responsive to the presence of an output signal from each of said signal producing means for rendering said first and second gating means operative;
third gating means operable to couple each of said binary coded decimal counters to said setting means whereby each of said counters converts and stores a single digit of said decimal number; and
pulse producing means coupled to said third gating means and to said binary counter for operating said third gating means and resetting said binary counter to zero.

10. A decimal to binary converter comprising:
means for setting a multi-digit decimal number;
a plurality of binary coded decimal counters coupled to said setting means, each of said counters converting a single digit of said decimal number to its binary equivalent and storging the same;
a source of pulses;
a binary counter;
first gating means coupling said source of pulses to said binary coded decimal counters, said gating means being operable to permit said pulses to count down the binary coded decimal number stored in said counters;
second gating means coupling said source of pulses to said binary counter, said gating means being operable to permit said binary counter to count said pulses;
means coupled to each of said binary coded decimal counters for producing an output signal when there is no number stored in the respective counter;
and AND gate having a plurality of inputs coupled to the outputs of said output signal producing means for producing an output signal in response to the production of an output signal by each of said output signal producing means; and
means coupling said AND gate to said first and second gating means whereby said gating means are rendered operative when no output signal is produced by said AND gate and inoperative when an output signal is produced by said AND gate.

11. A decimal to binary converter comprising:
means for setting a multi-digit decimal number;
a plurality of binary coded decimal counters;
a source of pulses;
a binary counter;
first gating means coupling said source of pulses to said binary coded decimal counters, said gating means being operable to permit said pulses to count down the binary coded decimal number stored in said counters;
second gating means coupling said source of pulses to binary counter, said gating means being operable to permit said binary counter to count said pulses;
means coupled to each of said binary coded decimal counters for producing an output signal when there is no number stored in the respective counter;
an AND gate having a plurality of inputs coupled to the outputs of said output signal producing means for producing an output signal in response to the production of an output signal by each of said output signal producing means;
means coupling said AND gate to said first and second gating means whereby said gating means are rendered operative when no output signal is produced by said AND gate and inoperative when an output signal is produced by said AND gate;
third gating means operable to couple each of said binary coded decimal counters to said setting means whereby each of said counters converts and stores a single digit of said decimal number; and
pulse producing means coupled to said third gating means and to said binary counter for operating said third gating means and resetting said binary counter to zero.

12. A decimal to binary converter comprising:
means for manually setting a multi-digit decimal number;
a plurality of multi-stage binary coded decimal counters coupled to said setting means, each of said counters converting a single digit of said decimal number to its binary equivalent and storing the same;
a source of pulses;
a binary counter;

first gating means coupling said source of pulses to said binary coded decimal counter, said gating means being operable to permit said pulses to count down the binary coded decimal number stored in said counters;

second gating means coupling said source of pulses to said binary counter, said gating means being operable to permit said binary counter to count said pulses;

a plurality of coincidence circuits, each of said circuits having its inputs coupled to each stage of one of said counters whereby each of said circuits produces an output signal when there is no number stored in its respective counter;

an AND gate having a plurality of inputs coupled to the outputs of said coincidence circuits for producing an output signal in response to the production of an output signal by each of said coincidence circuits; and means coupling said AND gate to said first and second gating means whereby said gating means are rendered operative when no output signal is produced by said AND gate and inoperative when an output signal is produced by said AND gate.

13. A decimal to binary converter comprising:

means for manually setting a multi-digit decimal number;

a pluraliy of multi-stage binary coded decimal counters;

a source of pulses;

a binary counter;

first gating means coupling said source of pulses to said binary coded decimal counters, said gating means being operable to permit said pulses to count down the binary coded decimal number stored in said counters;

second gating means coupling said source of pulses to said binary counter, said gating means being operable to permit said binary counter to count said pulses;

a plurality of coincidence circuits, each of said circuits having its inputs coupled to each stage of one of said counters whereby each of said circuits produces an output signal when there is no number stored in its respective counter;

an AND gate having a plurality of inputs coupled to the ouputs of said coincidence circuits for producing an output signal in response to the production of an output signal by each of said coincidence circuits;

means coupling said AND gate to said first and second gating means whereby said gating means are rendered operative when no output signal is produced by said AND gate and inoperative when an output signal is produced by said AND gate;

third gating means operable to couple each of said binary coded decimal counters to said setting means whereby each of said counters converts and stores a single digit of said decimal number; and pulse producing means coupled to said third gating means and to said binary counter for operating said third gating means and resetting said binary counter to zero.

14. The converter of claim 13 wherein said coincidence circuits are AND gates having inputs coupled to the zero output of each stage of their respective counters.

15. The converter of claim 13 wherein said first and second gating means are AND gates having a first input coupled to said source of pulses and a second input coupled to the output of said AND gate.

16. The converter of claim 15 wherein an inverter couples the output of said AND gate with said AND gates of said first and second gating means.

17. The converter of claim 16 wherein said pulse producing means includes a flip-flop circuit which is turned on by the occurrence of a start pulse and turned off by the coincidence of its output pulse and a pulse from said source of pulses.

18. The converter of claim 17 wherein said coincidence also turns off a second flip-flop, said second flip-flop being turned on by the output signal of said AND gate.

No references cited.

MAYNARD R. WILBUR, *Primary Examiner.*

A. L. NEWMAN, *Assistant Examiner.*